(12) United States Patent
Helms et al.

(10) Patent No.: US 7,146,510 B1
(45) Date of Patent: Dec. 5, 2006

(54) USE OF A SIGNAL LINE TO ADJUST WIDTH AND/OR FREQUENCY OF A COMMUNICATION LINK DURING SYSTEM OPERATION

(75) Inventors: Frank P. Helms, Round Rock, TX (US); Derrick R. Meyer, Austin, TX (US); Larry D. Hewitt, Austin, TX (US); Dale E. Gulick, Austin, TX (US); William A. Hughes, Burlingame, CA (US); Scott E. Swanstrom, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 533 days.

(21) Appl. No.: 10/198,637

(22) Filed: Jul. 18, 2002

Related U.S. Application Data

(63) Continuation-in-part of application No. 10/185,195, filed on Jun. 28, 2002, now Pat. No. 7,051,218.

(60) Provisional application No. 60/306,361, filed on Jul. 18, 2001.

(51) Int. Cl.
*G06F 1/26* (2006.01)
*G06F 1/32* (2006.01)

(52) U.S. Cl. .................... 713/300; 713/320

(58) Field of Classification Search ............ 713/300, 713/322, 400, 320
See application file for complete search history.

(56) References Cited

U.S. PATENT DOCUMENTS 4,633,437 A * 12/1986 Mothersole et al. .......... 710/74
4,710,922 A   12/1987 Scott
4,958,344 A    9/1990 Scott
5,255,374 A   10/1993 Aldereguia et al.
5,280,598 A *  1/1994 Osaki et al. ................ 710/310
5,349,693 A    9/1994 Matsushita (Continued)

FOREIGN PATENT DOCUMENTS

EP        1146429        10/2001

OTHER PUBLICATIONS

"HyperTransport™ I/O Link Specification," HyperTransport Technology Consortium, Revision 1.03, Oct. 10, 2001, pp. 1-217.

(Continued)

*Primary Examiner*—Thomas Lee
*Assistant Examiner*—Ji H. Bae
(74) *Attorney, Agent, or Firm*—Zagorin O'Brien Graham LLP

(57) ABSTRACT

An integrated circuit is coupled to a communication link and to a separate signal line and includes programmable registers specifying communication link width and frequency. The integrated circuit responds to a change in the value of the signal line by changing the width and/or frequency of at least a portion of the communication link to the programmed value in response to a change in a logical value of the signal line, without the integrated circuit entering a reset state. The width and/or frequency may be changed during a POST routine or during system operation as part of a power management or other system function while maintaining its operational state.

16 Claims, 8 Drawing Sheets

U.S. PATENT DOCUMENTS

| | | | |
|---|---|---|---|
| 5,394,528 | A | 2/1995 | Kobayashi et al. |
| 5,461,723 | A | 10/1995 | Shah et al. |
| 5,613,078 | A * | 3/1997 | Kishigami ............. 710/307 |
| 5,630,107 | A * | 5/1997 | Carmean et al. .......... 713/601 |
| 5,761,456 | A | 6/1998 | Titus et al. |
| 5,774,703 | A * | 6/1998 | Weiss et al. ............. 713/501 |
| 5,987,617 | A * | 11/1999 | Hu et al. ................. 713/320 |
| 5,996,083 | A * | 11/1999 | Gupta et al. ............. 713/322 |
| 6,032,178 | A * | 2/2000 | Bacigalupo et al. ........ 709/208 |
| 6,282,662 | B1 | 8/2001 | Zeller et al. |
| 6,591,369 | B1 * | 7/2003 | Edwards et al. ............ 713/400 |
| 6,658,010 | B1 | 12/2003 | Enns et al. |
| 6,715,090 | B1 * | 3/2004 | Totsuka et al. ............ 713/323 |
| 6,725,310 | B1 | 4/2004 | Shoobe et al. |
| 6,738,068 | B1 | 5/2004 | Cohen et al. |
| 2003/0088799 | A1 * | 5/2003 | Bodas ....................... 713/320 |
| 2006/0041704 | A1 | 2/2006 | Choi |

OTHER PUBLICATIONS

"HyperTransport™ Technology I/O Link," Advanced Micro Devices, Inc., Jul. 20, 2001, pp. 1-25.

U.S. Appl. No. 10/185,171, filed Jun. 28, 2002, entitled "Message Based Power Management in a Multi-Processor System" by Frank P. Helms, et al.

U.S. Appl. No. 10/185,195, filed Jun. 28, 2002, entitled "Message Based Power Management" by Dale E. Gulick, et al.

U.S. Appl. No. 10/647,397, filed Aug. 25, 2003 entitled "Configuring a Communication Link Interface," naming inventors Larry D. Hewitt and Dale E. Gulick, (109 pages).

* cited by examiner

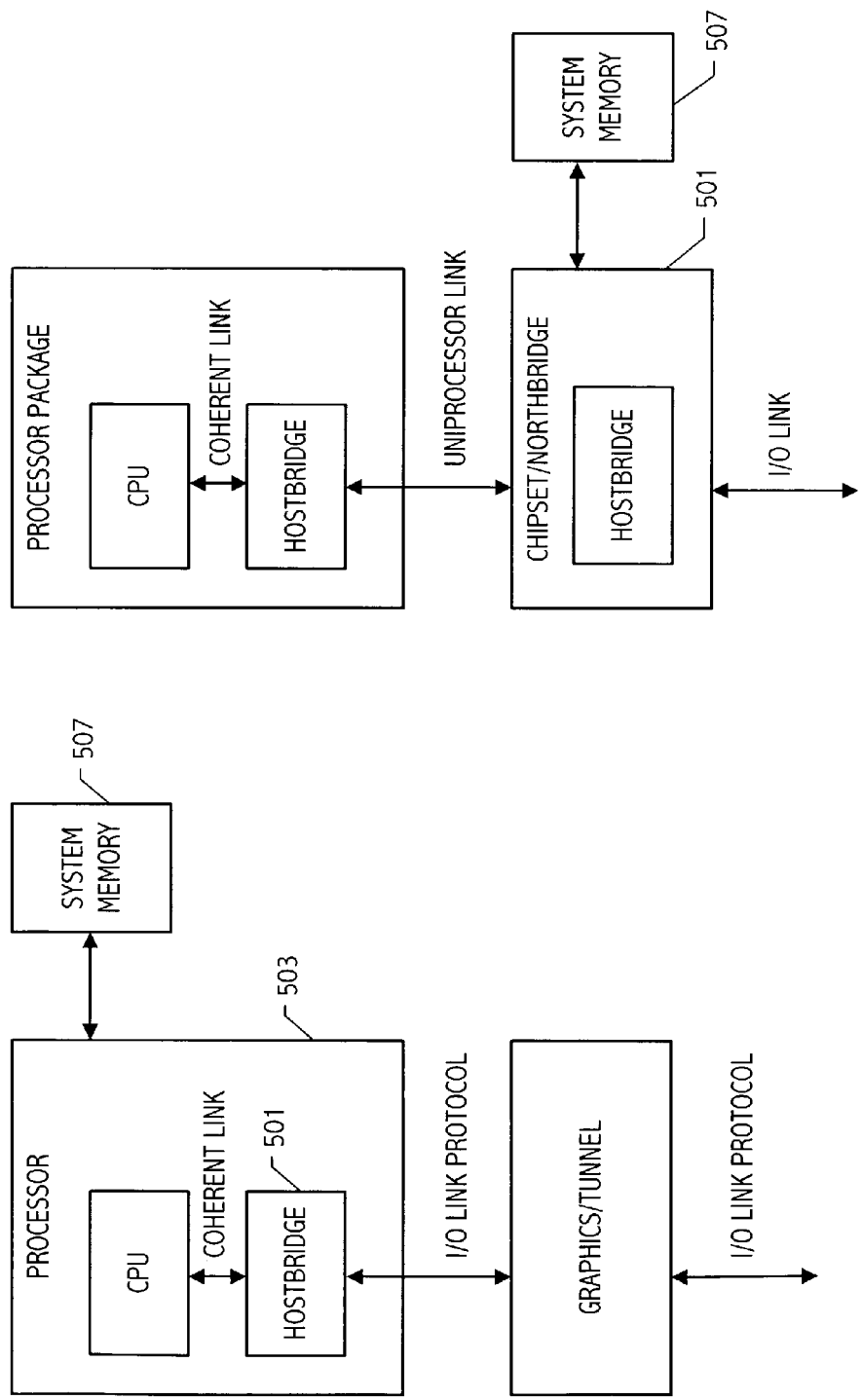

| LINKWIDTHOUT | LINKWIDTHIN | MAXLINKWIDTHOUT | MAXLINKWIDTHIN |
|---|---|---|---|

FIG. 6A

| LINK WIDTH[2:0] | WIDTH |
|---|---|
| 000 | 8 BITS |
| 001 | 16 BITS |
| 010 | RESERVED |
| 011 | 32 BITS |
| 100 | 2 BITS |
| 101 | 4 BITS |
| 110 | RESERVED |
| 111 | LINK NOT PHYSICALLY CONNECTED |

FIG. 6B

| LINK FREQUENCY ENCODING | TRANSMITTER CLOCK FREQUENCY (MHZ) |
| --- | --- |
| 0000 | 200 (DEFAULT) |
| 0001 | 300 |
| 0010 | 400 |
| 0011 | 500 |
| 0100 | 600 |
| 0101 | 800 |
| 0110 | 1000 |
| 0111 TO 1110 | RESERVED |
| 1111 | VENDOR-SPECIFIC |

FIG. 6C

| BIT TIME | 7 | 6 | 5 | 4 | 3 | 2 | 1 | 0 |
|---|---|---|---|---|---|---|---|---|
| 0 | SeqId[3:2] | | Cmd[5:0] | | | | | |
| 1 | PassPW | SeqId[1:0] | | UnitID[4:0] | | | | |
| 2 | Count[1:0] | | Reserved | | | | | |
| 3 | Rsv | | | | | | Count[3:2] | |
| 4 | SysMgtCmd[7:0] | | | | | | | |
| 5 | Addr[23:20] | | | | Rsv | | | |
| 6 | Addr[31:24] | | | | | | | |
| 7 | Addr[39:32] | | | | | | | |

FIG. 7A

| BIT TIME | 7 | 6 | 5 | 4 | 3 | 2 | 1 | 0 |
|---|---|---|---|---|---|---|---|---|
| 0 | SeqId[3:2] | | Cmd[5:0] | | | | | |
| 1 | PassPW | SeqId[1:0] | | UnitID[4:0] | | | | |
| 2 | Reserved | | | | | | | |
| 3 | Reserved | | | | | | | |
| 4 | SysMgtCmd[7:0] | | | | | | | |
| 5 | Addr[23:20] | | | | Rsv | | | |
| 6 | Addr[31:24] | | | | | | | |
| 7 | Addr[39:32] | | | | | | | |

FIG. 7B

USE OF A SIGNAL LINE TO ADJUST WIDTH AND/OR FREQUENCY OF A COMMUNICATION LINK DURING SYSTEM OPERATION

CROSS-REFERENCE TO RELATED APPLICATION(S)

This application is a continuation-in-part of U.S. patent application Ser. No. 10/185,195, filed Jun. 28, 2002 now U.S. Pat. No. 7,051,218, entitled "Message Based Power Management", listing Dale E. Gulick et al. as inventors, which claims the benefit under 35 U.S.C. § 119(e) of provisional application 60/306,361, filed Jul. 18, 2001. This application also claims the benefit under 35 U.S.C. § 119(e) of provisional application 60/306,361, filed Jul. 18, 2001.

BACKGROUND

1. Field of the Invention

The invention relates to computer systems and more particularly to controlling the width and/or frequency of communication links used in computer systems.

2. Description of the Related Art

Power consumption and associated performance and thermal issues are considerations for every computer system design. Many power saving techniques have been introduced to save power and mitigate the impact of thermal and battery power constraints. The frequency of operation (clock frequency) of the processor and its operating voltage can in large part determine its power consumption. Since power consumption and therefore heat generation are roughly proportional to the processor's frequency of operation, scaling down the processor's frequency has been a common method of staying within appropriate power limitations. Microprocessors utilized in mobile applications, i.e., those used in battery powered systems, are particularly sensitive to power considerations. That is in part due to the small, densely packed system construction that limits the ability of the mobile computer system to dissipate the heat generated by computer operation.

While power consumption issues are particularly important for portable computers, power consumption issues are important for all types of computers. For example, while battery life may not be a consideration for desktop computers, thermal considerations are still an important criteria. In particular, for desktop computers, the hotter they run, the more likely fans are turned on to try and cool the processor, which results in fan noise or frequent cycling of the fans, which may be objectionable to the computer user. In addition, saving power can have real economic benefits in terms of reduced electricity costs. Further, reduced power consumption and lower operating temperatures can improve system reliability. Reduced power consumption and lower operating temperatures can also allow for higher density server farms.

It would be advantageous to be able to control the width and frequency of communication links in a computer system both to provide power management capability as well as to provide flexibility in system design and configuration. It would be further desirable to be able to adjust width and frequency of communication links while the system remains in an operational state.

SUMMARY

Accordingly, in one embodiment, the invention provides a method for a device coupled to a communication link and coupled to a signal line. The method includes changing a width of at least a portion of the communication link to a desired width in response to a change in a logical value of the signal line without the device entering a reset state. The width may be changed during a POST routine or as part of a power management function. The method may further include changing a frequency of operation of at least a portion of the communication link to a desired frequency in response to the change in the logical value of the signal line without the device entering a reset state.

In another embodiment, the invention provides a computer system that includes a first integrated circuit coupled to a communication link. A control signal is coupled to the integrated circuit, which includes a first programmable register specifying a width of a data portion of the communication link. The first integrated circuit is responsive to a change in logic levels assertion of the control signal to adjust the width of the data portion of the communication link according to a value of the first programmable register. The first integrated circuit adjusts the width of the data portion while maintaining its operational state.

The first integrated circuit may include a second programmable storage location specifying a frequency of operation of the communication link. The integrated circuit responds to a change in the logical value of the control signal to adjust the frequency of the communication link according to a value of the second programmable storage location. The first integrated circuit adjusts the frequency of the data portion while maintaining its operational state.

BRIEF DESCRIPTION OF THE DRAWINGS

The present invention may be better understood, and its numerous objects, features, and advantages made apparent to those skilled in the art by referencing the accompanying drawings.

FIG. 5A illustrates a host bridge incorporated into the processor integrated circuit to support memory coupled directly to the processor.

FIG. 5B illustrates use of an external host bridge to support memory coupled to a chipset integrated circuit.

FIG. 6A illustrates a link configuration register having fields specifying the width of the link.

FIG. 6B illustrates the encoding for width fields in the link configuration register.

FIG. 6C illustrates the encoding for 4 bit frequency register that controls the frequency utilized by the transmit clock.

FIG. 7A shows a format of an exemplary system management message sent by the I/O hub upstream to the hostbridge.

FIG. 7B illustrates a format of an exemplary system management message sent by the hostbridge downstream.

The use of the same reference symbols in different drawings indicates similar or identical items.

DESCRIPTION OF THE PREFERRED EMBODIMENT(S)

In accordance with the present invention, the width and/or frequency of one or more communication links of a computer system is adjustable. During a power-on sequence or after a reset operation, a width and/or frequency is initially set for each of the communication links that have such capability. In addition, in order to provide enhanced flexibility, that can be utilized, for example by power management, or for fault tolerance, the width and/or frequency can also be adjusted during system operation.

During the power-up sequence or after a system reset resulting from a power-on sequence or other system event resulting in a reset condition, the microprocessor(s) in the computer system execute initialization code that is typically stored in an external Read-Only Memory (ROM). That code is referred to as Basic Input Output System (BIOS) code. The BIOS is responsible for system level operations such as initializing and testing the system hardware such as the microprocessor(s), memory, and other hardware components. That portion of BIOS code is known as Power On Self Test (POST).

One task that can be accomplished during the POST routine as part of the hardware initialization configuration is to configure the various communication links in the system (that can be configured) for width and/or frequency. During system operation, and during the POST routine, using a mechanism other than a reset to adjust width and/or frequency allows the width/frequency change to occur without the computer system entering a reset state during the reconfiguration to the new width and/or frequency. If a reset was required in order to establish the width or frequency of a communication link during the POST routine, that could cause the POST routine to execute again from the beginning, resulting in extra time spent to complete the POST routine. In addition, if a reset were required in order to accomplish a change in link width or frequency after the POST routine, that is during normal system operation, such changes during system operation would be complicated and time consuming, requiring, e.g., saving system state prior to adjusting width and frequency. Use of a control signal separate from a reset signal to effect changes in link width and/or link frequency as described herein allows the configuration to occur without entering a reset state.

Figure 1:
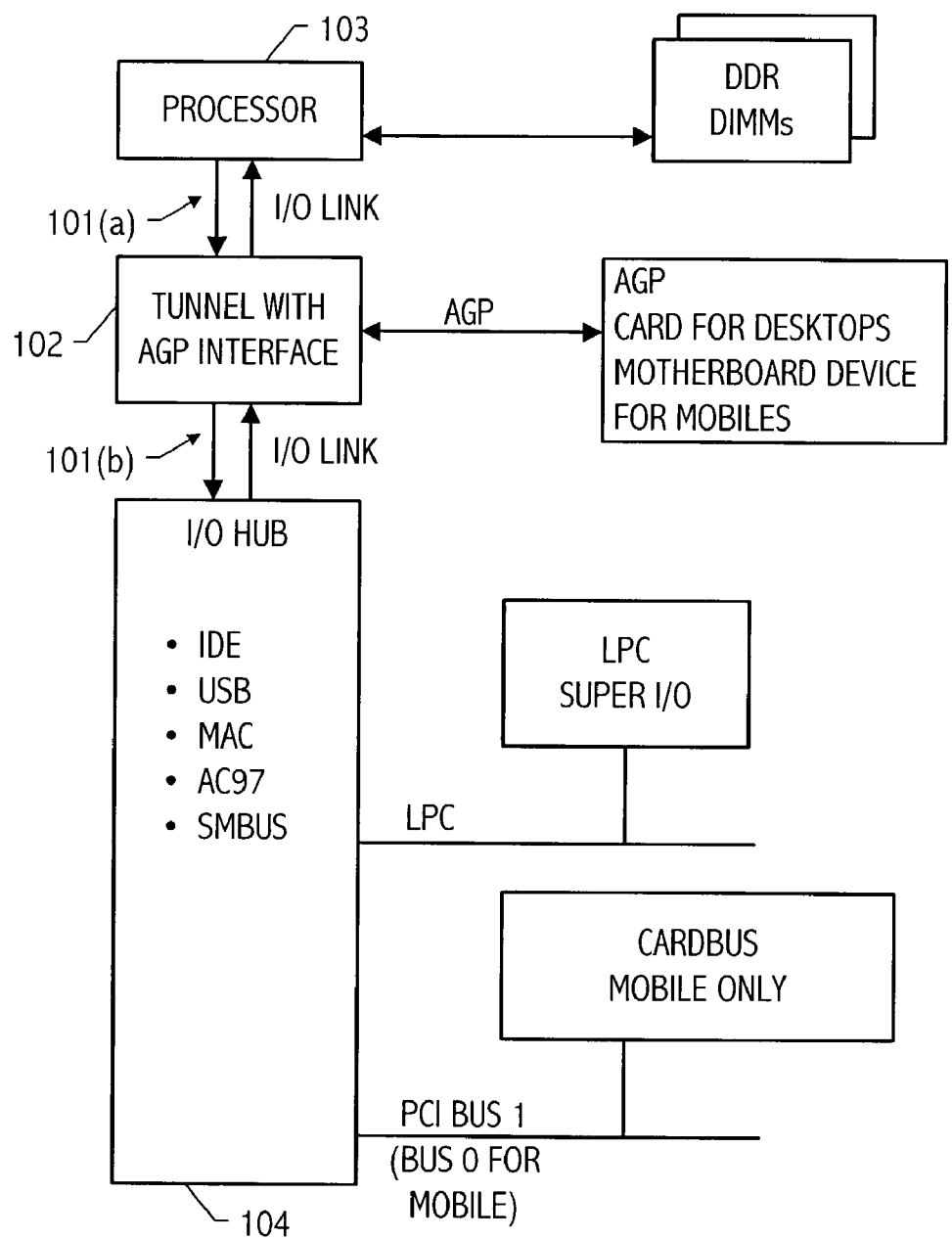
FIG. 1 illustrates a single processor system configuration capable of utilizing one or more embodiments of the present invention.

The link width/frequency configuration capabilities discussed herein are applicable to uni-processor (1P) or multi-processor (MP) systems as well other electronic systems utilizing a communication link capable of configuration with respect to width and/or frequency. FIG. 1 provides a block diagram of an exemplary uni-processor system suitable for exploiting the link configuration capabilities described herein. The input/output (I/O) links 101*a* and 101*b* couple processor 103 through tunnel integrated circuit 102 to the I/O hub integrated circuit 104 and thus to input/output devices. In the illustrated embodiment, the tunnel integrated circuit 102 provides an Accelerated Graphics Port (AGP) interface to AGP functionality that may be implemented as a separate graphics card in a desktop system or may be implemented as a motherboard device in a mobile system.

The input output (I/O) hub 104 provides much of the functionality provided in prior art systems by the south bridge component of the chipset supporting processor operations. For example, the I/O hub provides access to devices of such exemplary interfaces and/or buses as Intelligent Drive Electronics (IDE), Universal Serial Bus (USB), Media Access Control Controller (MAC), AC97, SMBus, Low Pin Count (LPC) bus, and PCI bus. Additional interfaces, in addition to or instead of, those shown may of course be utilized. Thus, typical I/O functions may be accessed by the processors through the I/O hub 104. Note that a south bridge can be utilized to support embodiments of the invention described herein. As shown in FIG. 1, the communication links 101*a* and 101*b* may be part of a daisy chained point to point interconnection where one device passes on anything not intended for that device either upstream (towards the hostbridge) or downstream (away from the hostbridge).

Figure 2:
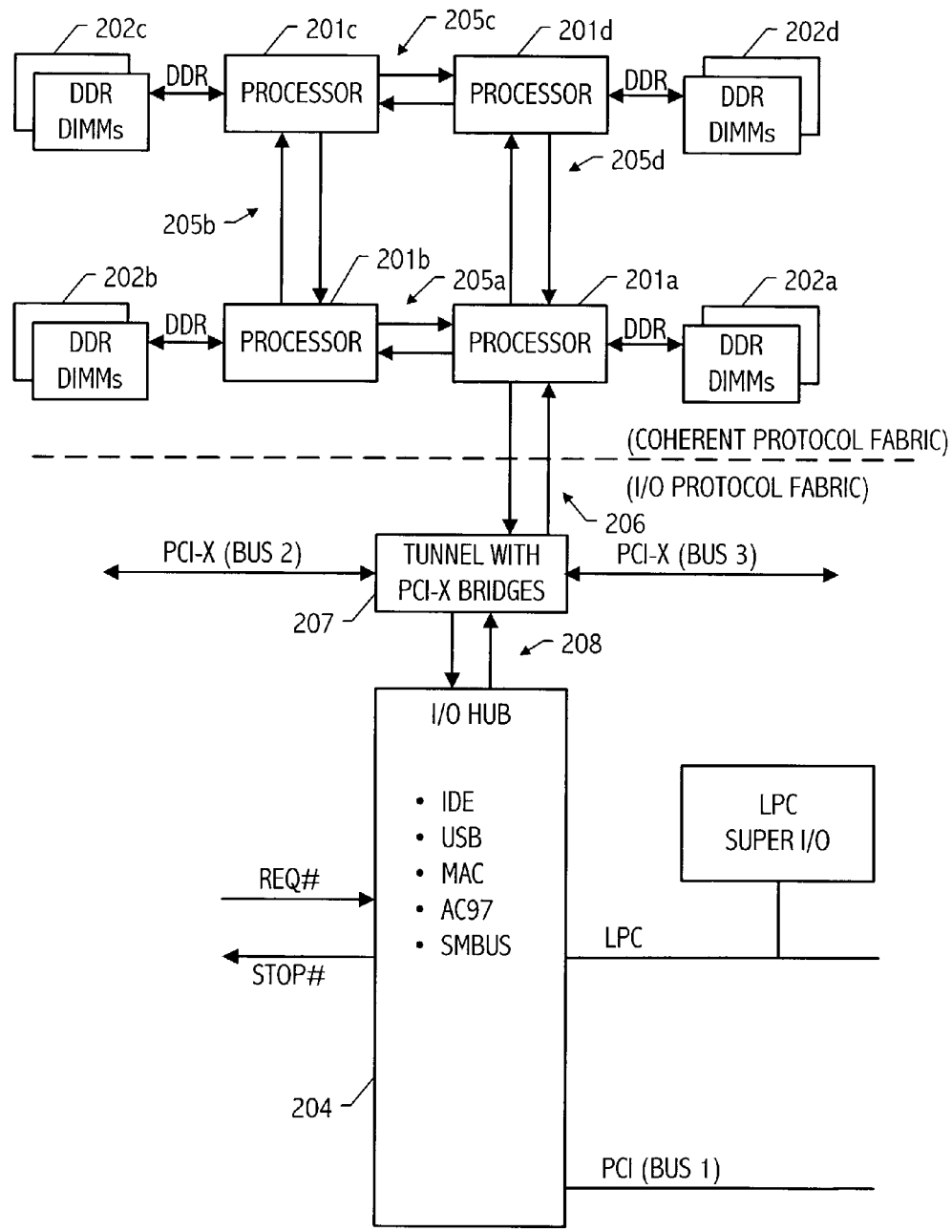
FIG. 2 illustrates a multi-processor system configuration capable of utilizing one or more embodiments of the present invention.

FIG. 2 shows a block diagram of a multi-processor system that can advantageously utilize the link configuration capabilities described herein. The multi-processor system includes respective processors 201*a*–201*d* coupled to respective memories 202*a*–202*d*. Each of the processors is connected by a communication link 205*a*–205*d* to other processors. The communication links coupling the processor support the ability to maintain appropriate coherency between the various memories 202*a*–202*d* and the cache memories of processor 201*a* through 201*d* in a multi-processor environment. In addition, processor 201*a* is coupled to the tunnel integrated circuit 207 through I/O link 206. Thus the processors access I/O devices (and vice versa) through the processor integrated circuit 201*a*. The I/O Hub 204 is coupled to the tunnel chip 207 through an I/O link 208. Note that the I/O links are generally assumed to not be a part of the coherent fabric.

Figure 3:
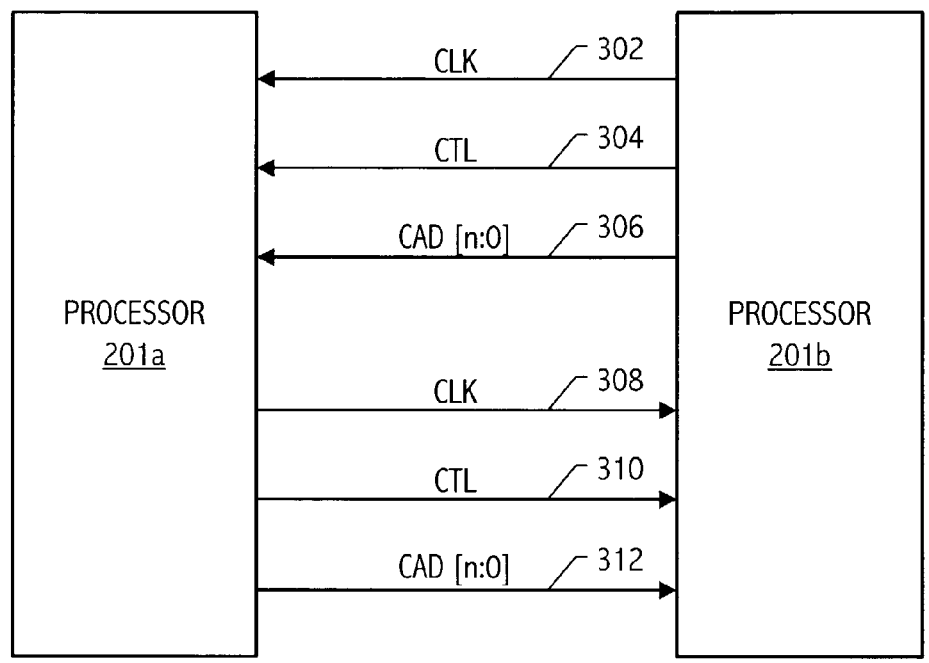
FIG. 3 illustrates details of an exemplary coherent link shown in FIG. 2.
Figure 4:
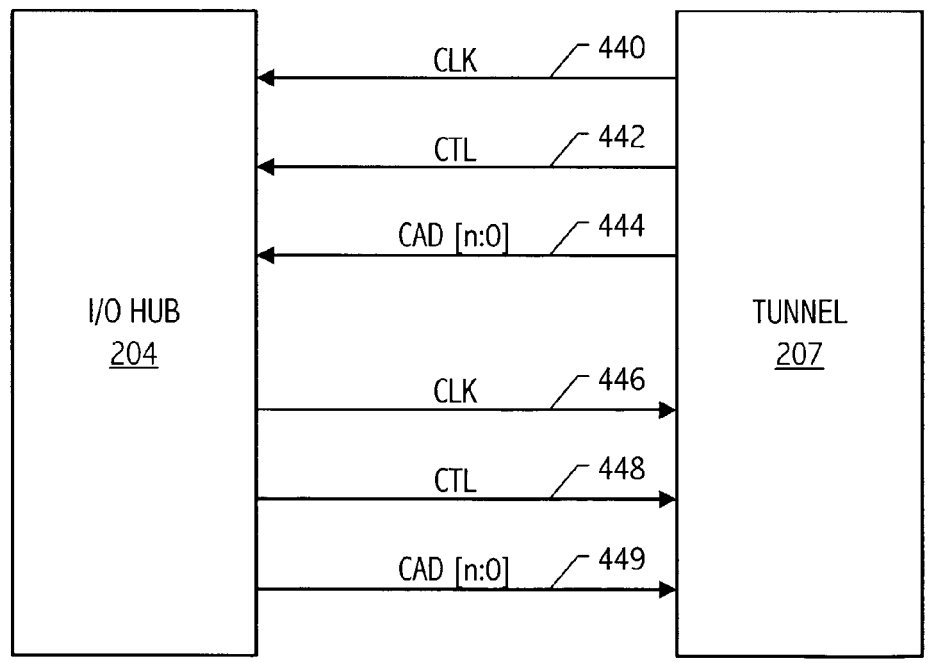
FIG. 4 illustrates details of an exemplary non-coherent or I/O link shown in FIG. 2.

Details of an exemplary embodiment of the link formed by links 205*a*–205*d* and the link formed by links 206 and 208 are shown respectively in FIGS. 3 and 4. FIG. 3, a block diagram with processors 201*a* and 201*b*, illustrates one embodiment of the coherent link in more detail. Other embodiments are possible and contemplated. In the embodiment of FIG. 3, the coherent link is shown to include two sets of unidirectional lines. Clock line 302, a control line 304, and a control/address/data bus 306 are the first set of unidirectional lines coupled between the processors. Similarly, the other unidirectional portion of the link includes clock line 308, a control line 310, and control/address/data (CAD) bus 312.

The clock line of the coherent link may transmit a clock signal that indicates a sample point for the control line and the CAD bus. In one particular embodiment, data/control bits may be transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A coherent packet may be transmitted across two or more bit times. Multiple clock lines may be used depending upon the width of the control/address/data bus. For example, four clock lines may be used for a 32 bit control/address/data bus, one for each eight bit portion.

The control line may indicate whether or not the data transmitted upon the control/address/data bus is either a bit time of a coherent control packet or a bit time of a coherent data packet. The control line, in one embodiment, may be asserted to indicate a coherent control packet, and deasserted to indicate a coherent data packet. Certain coherent control packets may indicate that a coherent data packet follows. The coherent data packet may immediately follow the corresponding coherent control packet. In one embodiment, other coherent control packets may interrupt the transmission of a coherent data packet. Such an interruption may be performed by asserting the control line for a number of bit times during transmission of the coherent data packet and transmitting the bit times of the coherent control packet while the control line is asserted. Coherent control packets which interrupt a coherent data packet may not indicate that a coherent data packet will be following.

The control/address/data bus comprises a set of lines for transmitting data/control bits. In one embodiment, the control/address/data bus may comprise different width of e.g., 8, 16, or 32 lines. Each coherent link may employ any one of the supported numbers of lines according to design choice. Other embodiments may support other sizes of control/address/data bus as desired.

According to one embodiment, the command/address/data bus lines and the clock line carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage). Note the lines may also be implemented as differential rather than single ended signals.

Turning next to FIG. 4, a block diagram with I/O Hub processing node 204 and tunnel 207 is shown to illustrate one embodiment of the non-coherent link in more detail. Other embodiments are possible and contemplated. In the embodiment of FIG. 4, the I/O link is similar to the coherent link and includes two sets of unidirectional lines. Clock line 440, a control line 442, and a control/address/data bus 444 are the first set of unidirectional lines coupled between the nodes. Similarly, the other unidirectional portion of the link includes clock line 446, a control line 448, and a control/address/data bus 449.

Similar to the coherent link, the clock line in the non-coherent link between a node and an I/O bridge may transmit a clock signal that indicates a sample point for the control line and the control/address/data bus. In one particular embodiment, data/control bits may be transmitted on each edge (i.e. rising edge and falling edge) of the clock signal. Accordingly, two data bits per line may be transmitted per clock cycle in the non-coherent link. The amount of time employed to transmit one bit per line is referred to herein as a "bit time". The above-mentioned embodiment may include two bit times per clock cycle. A non-coherent packet may be transmitted across two or more bit times. Multiple clock lines may be used depending upon the width of the control/address/data bus. For example, four clock lines may be used for a 32 bit control/address/data bus, one for each eight bit portion.

The control line may indicate whether or not the data transmitted upon the control/address/data (CAD) bus is either a bit time of a non-coherent control packet or a bit time of a non-coherent data packet. The control line, in one embodiment, may be asserted to indicate a non-coherent control packet, and deasserted to indicate a non-coherent data packet. Certain non-coherent control packets may indicate that a non-coherent data packet follows. The non-coherent data packet may immediately follow the corresponding non-coherent control packet. In one embodiment, other non-coherent control packets may interrupt the transmission of a non-coherent data packet. Such an interruption may be performed by asserting the control line for a number of bit times during transmission of the non-coherent data packet and transmitting the bit times of the non-coherent control packet while the control line is asserted. Non-coherent control packets which interrupt a non-coherent data packet may not indicate that a non-coherent data packet will be following.

The control/address/data bus comprises a set of lines for transmitting the data/control bits. In one embodiment, the control/address/data bus may comprise 8, 16, or 32 lines. Each non-coherent link may employ any one of the supported numbers of lines according to design choice. Other embodiments may support other sizes of control/address/data bus as desired. In addition, as described herein, the size of the link may be changed.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage). Note the lines may also be implemented as differential rather than single ended signals.

As described further herein, messages may be passed over the communication links described above to accomplish power management functions. Those power management messages may be utilized in adjusting the link width and/or frequency as described further herein. Exemplary power management mechanisms in such a system include reducing the processor's power consumption to nearly static levels during Halt and Stop Grant states. Performance state management is accomplished by changing a processor register (VID/FID) specifying the voltage ID (VID) and frequency ID (FID) used by the processor as described further herein. Processor performance states are combinations of processor core voltage and core frequency that can be dynamically changed during the processor working state. Exemplary power savings mechanisms also include providing bus power management such as the capability to dynamically stop and start the communication links during C3, S1, thermal throttling, and device power management during the C3 and S1 states. In addition, power management may provide software controlled reduced power device states (D-states and performance states) as well as hardware automated device power reduction.

In addition to the communication link signals described above, systems may utilize, where appropriate, additional signals to facilitate power management and link width/frequency configuration activities. One such control signal can be utilized to facilitate link width and/or frequency adjustments. In one embodiment, one such signal is a LDTSTOP# signal (the # indicating an active low signal). The LDTSTOP# signal may be supplied as an output of the I/O Hub or south bridge (see FIG. 2) and an input to other devices coupled to the communication links. The LDTSTOP# signal may be used for re-sizing the communication link width, and changing the link frequency without having to reset the entire system, and for power management functions such as stopping and tri-stating the communication link drivers in low power state, and changing the processor's core voltage and frequency during the working state. In addition, the LDTSTOP# signal can be used to prevent probe activity while throttling the processor for thermal reasons. That use may be constrained by Stop Grant exit latency and the throttling period. In addition the LDTSTOP# signal can be used in controlling the processor power management and processor clock grid(s) for the I/O communication link I/F (part of the host bridge) and the memory controller power management.

A second signal that may be used in addition to the communication link signals described above is a request (REQ#) signal, which is an input to the I/O Hub and an optional open drain output of devices on the communication link except for the processor(s). A device asserts the REQ# signal whenever it has a transaction outstanding in the communication link fabric, or when it needs to initiate a new transaction into the communication link fabric. The REQ# signal provides the functionality of enabling bus masters to bring the processor out of the C3 state. AGP masters may assert REQ# for any access which would cause the processor caches to be probed. For notebooks, integrated graphics/northbridge/memory controllers should not assert REQ# for accesses to memory which are non-cached, like accesses to the frame buffer for display refresh assuming the frame buffer is local, not remote across a link.

Thus, in one embodiment when REQ# is asserted, the I/O Hub sets the bus master status (BM_STS) bit in the industry standard ACPI PM1 Status register. In addition, the I/O hub de-asserts the LDTSTOP# signal if it was asserted for the ACPI C3 state. The I/O Hub brings the processor out of the C3 state if currently in C3 and the BM_RLD bit in the ACPI PM1 control register, which determines if the Cx power state is exited upon a request from a bus master, is set in response to the REQ# signal being asserted by one of the devices.

Referring again to FIG. 2, processor 201(a) includes a host bridge function that bridges between the coherent communication link protocol used by the processor(s) on links 205a–205d and the I/O protocol in the communication link connecting the rest of the devices in the system. In one possible configuration, shown in FIG. 5A, the host bridge 501 is located on the processor 503 and interfaces to the I/O communication link. That configuration may be used, e.g., in a system where system memory 507 is connected to processor. Note that the embodiments discussed herein generally assume the host bridge is located in the processor coupled to the I/O link. However, the concepts discussed are valid for an external host bridge located in an integrated circuit such as the north bridge component of a chipset as shown in FIG. 5B to allow for chipset control of system memory.

In one embodiment, a link configuration register exists for each link present on a device. As explained further herein, software updates may be utilized to adjust the width of the link. Those updates take effect after a warm reset sequence described further herein and, depending on the field, also after an LDTSTOP# disconnect sequence described further herein. In one embodiment, the system utilizes a cold and a warm reset. During a cold reset, all configuration and control bits take their appropriate predetermined values. During a warm reset, certain configuration/control bits may be defined to be persistent and not be affected during a warm reset. However, the machine state is changed during a warm reset.

The link configuration register includes, as shown in FIG. 6A, a 3 bit field (LinkWidthOut) specifying the width of the of the CAD lines transmitted by the device and a 3 bit field (LinkWidthIn) that specifies the width of the CAD lines received by the device. In addition, the configuration register specifies a maximum link width (MaxLinkWidthOut) for transmitted CAD lines and a maximum link width (MaxLinkWidthIn) for received CAD lines, both three bit fields. The exemplary maximum link width field can encode up to eight widths. FIG. 6B shows for one embodiment, the encoding for the maximum and programmable link width fields shown in FIG. 6A for both incoming and outgoing CAD lines.

The maximum link width field specifies the physical width of the link as implemented by the device. Note that the programmable link width specified in FIG. 6 should not be greater than the physical width. After a cold reset the Link Width In field is initialized by hardware based on the results of a link-width negotiation, which is described for one embodiment in the HyperTransport™ I/O Link specification, Revision 1.03, dated Oct. 10, 2001, which is incorporated by reference herein. Software can then write a different value into the configuration register based on the sizing available. For the new width values to be reflected on the link, a warm reset or an LDTSTOP# disconnect/reconnect sequence is performed. Note that the link configuration register may include additional control bits related to flow control as described in the HyperTransport™ I/O Link specification.

The LinkWidthIn field in the link receiver should match the LinkWidthOut field in the link transmitter of the device on the other side of the link. The LinkWidthIn and LinkWidthOut fields within the same device do not have to have matching values. If two sides of a link are programmed to different widths when a RESET# or LDTSTOP# assertion occurs, the link may not be able to complete the initialization sequence. The system design should ensure that RESET# or LDTSTOP# will not be asserted while software is writing new link width values.

The Link Width Out field controls the utilized width of the outgoing side of the link. LinkWidthIn, this field is initialized after cold reset by hardware based on the results of the link width negotiation sequence described further herein. Note that byte lanes that are disabled due to the LinkWidthOut value being set narrower than the physically implemented width of the link will have their transmitters shut down.

In one embodiment, link frequency is controlled by a 4 bit field in a link configuration register. FIG. 6C illustrates the encoding for a 4 bit frequency register that controls the frequency utilized by the transmit clock. The frequency register may be written and an LDTSTOP# disconnect/reconnect sequence employed to adjust the link frequency as described further herein.

As part of one or more power saving mechanisms, the communication link may have its width or frequency adjusted, e.g., according to operating conditions. For example, the width of the CAD lines may be reduced if the current utilization of the system is light. In addition, the clock utilized on the link may be slowed in response to reduced system utilization. On the other hand, a heavy utilization of the system may require the link width to be increased and/or link frequency be increased. The BIOS or other application or operating system code should program the desired value into the link width and/or the link frequency registers prior to assertion of the LDTSTOP# signal. On assertion of the LDTSTOP# signal, the new link width and/or frequency values are utilized by the link drivers and receivers. Alternatively, the new values may be utilized after deassertion of LDSTOP#.

In one embodiment, a disconnect/reconnect sequence is utilized to effect link width and/or frequency changes. In an embodiment operating in accordance with the HyperTransport™ Link protocol, a special disconnect NOP packet is utilized in conjunction with the LDTSTOP# signal as part of a disconnect sequence which disconnects a device from the link. Note that the electrical state of the link, and how the link responds to assertion of the LDTSTOP# signal may be controlled by a configuration bit in a control register. In one embodiment, the link drivers are placed in a high impedance state when disabled using the LDTSTOP# disconnect sequence according to a control bit in a configuration register. If the tristate control bit is not asserted the link drivers drive logic 1 on the programmed width of the CAD signals, the clock is toggling and the CTL signal is at a logic 0. For drivers that are not part of the programmed width, the drivers drive signals that are logically undefined but within DC electrical specifications, e.g., at a logic 0.

A transmitter responds to the assertion of LDTSTOP# by finishing any control packet that is in progress and then sending a disconnect NOP packet. Note that in one embodiment, once LDTSTOP# is asserted, it remains asserted for a predetermined time period, e.g., 1 microsecond. The transmitter sends disconnect NOP packets (a NOP packet with a disconnect bit asserted) through the end of the current cyclic redundancy check (CRC) window (if the window is incomplete) and continuing through the transmission of the CRC bits for the current window. CRC provides error detection capability for transmitted packets. In an embodiment operating in accordance with the HyperTransport Link protocol, CRC is calculated on each 8-bit width of the link independently and covers the link as a whole, not individual packets. The CTL signal line is included in the CRC calculation. In each bit-time, CAD is operated on first, beginning with bit 0, followed by CTL (see FIGS. 4A and 4B). The CRC is computed over 512 bit-times. Each new CRC value is placed onto the CAD bits of the link 64 bit-times after the end of the 512-bit-time window and occupies the link for 4 bit-times. Therefore, bit-times 64–67 (the first bit-time being 0) of each CRC window contain the CRC value for the previous window. During transmission of the CRC, the value of the CTL signal line will be 1. Additional details on use of CRC and on disconnect sequences in accordance with the HyperTransport™ protocol can be found in the HyperTransport™ I/O Link Specification.

After sending the CRC bits for the current window, the transmitter sends disconnect NOP packets on the link for at least 64 bit-times, after which point the transmitter waits for the corresponding receiver on the same device to complete its disconnect sequence, and then disables its drivers. No CRC bits are transmitted for the last (partial) CRC window, which only contains disconnect NOP packets.

A receiver that receives the disconnect NOP packet continues to operate through the end of the current CRC window and into the next CRC window until it receives the CRC bits for the current window. After sampling the CRC bits for the current window, the receiver disables its input receivers to the extent required by the LDTSTOP#. Note that LDTSTOP# can deassert either before or after the link disconnection sequence is complete. A link transmitter should not respond to deassertion of LDTSTOP# until both its disconnect sequence and the disconnect sequence for the associated receiver on the same device is complete. Similarly, a link receiver responds to the deassertion of LDTSTOP# after both its disconnect sequence is complete and the disconnect sequence for the associated transmitter on the same device is complete.

Deassertion of the LDTSTOP# signal can also be used to reenable the communication link as part of the disconnect/reconnect sequence. More particularly, a transmitter may respond to the deassertion of LDTSTOP# to enable its drivers and restart the link according to an appropriate initialization protocol using updated width and/or frequency information from the link width fields and link frequency fields described previously. In one initialization protocol, the transmitter begins driving the CLK signal line and places the link in the state associated with the beginning of the initialization sequence (CTL=0, programmed CAD=1s, CLK toggling). If the drivers were in a high impedance state, the drivers that are part of the new programmed width value drive 1s. The transmitter may be required to have CLK running within a predetermined time period, e.g., 1 microsecond, to ensure that the receive logic has a clock source. In one embodiment, the clock frequency does not have to match the currently-programmed frequency before CTL is asserted. A receiver that is responsive to deassertion of the LDTSTOP# signal should wait a predetermined time period, e.g., at least one microsecond to ensure that it receives signals from the transmitted on the other side of the link that are valid. That is, the transmitter needs time to respond to deassertion of LDTSTOP# as well. When a transmitter's corresponding receiver on the same device has been enabled, it can begin the initialization sequence. After reconnecting to the link, the first transmitted packet after the initialization sequence is a control packet. That is true even if the link was disconnected in the middle of a data packet transmission. Link disconnect and reconnect sequences do not cause flow control buffers to be flushed, nor do they cause flow control buffer counts to be reset.

The timing of the sequence described below, in terms of bit-times, is the same for 8-, 16-, and 32-bit links. The bit-time counts for 4- and 2-bit links should be doubled and quadrupled, respectively. The discussion below refers to the CLK edges (rising or falling) across which the transmitter places new values on the CTL and CAD signals. Implied is that the receiver registers the new data (using the transmitted clock) using that the same clock edge (rising or falling). The transmitter's physical interface to the link delays the clock relative to the data in order to position the clock in the middle of the data window. A device-specific time after the deassertion of LDTSTOP#, each device asserts its CTL signal across a rising CLK edge, initiating a sync sequence.

The assertion of the CTL signal serves to indicate to the device at the other side of the link that this device is ready to initialize the link. When a device has asserted its own CTL signal and sampled the assertion of the CTL signal driven from the other device, it continues to drive a Sync packet for 16 bit-times (or 50 us after an LDTSTOP# disconnect as specified by a control bit) and then inverts both CAD and CTL across a rising clock edge. From this point until the initialization sequence is complete, unused bits of CAD are logically undefined, but the transmitter drives unused bits to electrical levels that satisfy the DC specification. Logic 0s are recommended for easier debug. The deassertion of the incoming CTL/CAD signals across a rising CLK edge is used in the transmit clock domain within each receiver to initialize the load pointer. The deassertion of the incoming CTL and CAD signals is synchronized to the core clock domain and used to initialize the unload pointer within each receiver. The length and uncertainty of this synchronizer should be included to determine the proper relationship between the load pointer and the unload pointer. Note that CTL cannot be used to initialize the pointers for byte lanes other than 0 in a multi-byte link, as CTL only exists within the byte 0 transmit clock domain. After this point, all transitions of CTL are on a 4-byte boundary Each device continues to drive this state on its outbound links for the predetermined number of bit-times. Each device then drives the CAD signals to logic 1 on a 4-byte boundary across a rising CLK edge, while leaving the CTL signal deasserted, for exactly four bit-times. The transition from all CAD signals deasserted to all CAD signals asserted serves to frame incoming packets. The first bit-time after these four must have CTL asserted, and is both the first bit-time of a new command packet and the first bit-time of the first CRC window. It also occurs across a rising CLK edge. Once the initialization sequence is complete, the transmitter should always drive unused bits of CAD to logic 0 to reduce noise and power.

Note that other communication links may exploit the teachings contained herein and have different initialization sequences. Assertion of LDTSTOP# should not occur while new link frequency and width values are being assigned by link-sizing software, or undefined operation may occur. This is because both sides of a link should have link width and frequency programmed, and if one side has been programmed with new values and the other has not yet been programmed, the width and/or frequency of the two sides will not match.

In one embodiment, the use of LDTSTOP# to change the link width and/or frequency is used in conjunction with the Stop Grant state of processors coupled to the link in order to ensure that the processors are in an appropriate state to adjust link width and/or frequency. In one such embodiment, described herein, system management commands are utilized as described below. In other embodiments, and/or for other devices connected to a link, entering the Stop Grant state is unnecessary.

An industry standard processor power savings mechanism utilized a STPCLK# signal line, from the south bridge to the processor to initiate the Stop Grant state in x86 compatible processors. In order to eliminate certain legacy signal lines and to provide a more flexible power management system, the various embodiments described herein use a communication link system management message for STPCLK (Stop Clock) functionality. The processor/communication link STPCLK/Stop Grant protocol provides one basis for system power management. Additional power management capability may be provided by automated power management, CPU internally initiated power management (Halt for example), and device power management that is software driver controlled.

In one embodiment STPCLK system management messages originate from the I/O hub. The source of the message may vary according to chipset implementation. The processor responds to the power management message according to the value of a programmable system management action field (SMAF) contained in the system management message. The processor response to the SMAF can be programmable. For example, the processor may have the following programmable power management actions that can be enabled during the Stop Grant state based on the SMAF passed during the Stop Grant system management message. The processor may divide the CPU clock grid by a programmable amount (either do not ramp the grid down, or divide by, e.g., 8 through 512) during the Stop Grant state. The processor may perform a VID/FID change based on programming of a machine specific register (MSR) in response to the next LDTSTOP# assertion. The processor may place system memory (DDR SDRAM) into self refresh mode and enable clock control to reduce the processor's integrated north bridge power consumption. The integrated processor north bridge refers to the host bridge and memory controller functionality that may be integrated with the processor. Note that if used, the memory controller in the processor can place memory into self refresh mode when LDTSTOP# is asserted.

An exemplary system management message format sent by the hub is shown in FIG. 7A. The system management command includes a system management command field (SysMgtCmd[7:0]). Exemplary decoding of the system management command is shown in Table 1.

TABLE 1

| SysMgtCmd | Command Type |
| --- | --- |
| 0000 xxxx | Reserved |
| 0001 xxxx | 86 legacy inputs to the processor. New state of signal:<br>[0]: IGNNE<br>[1]: A20M<br>[2]: Reserved<br>[3]: Reserved |
| 0010 xxxx | x86 legacy output from the processor. New state of signal:<br>[0]: FERR<br>[3:1]: Reserved |
| 0011 xxxx | [0]: STPCLK.<br>[3:1]: SMAF |
| 0100 xxxx | SHUTDOWN<br>[3:0]: Reserved. |
| 0101 xxxx | HALT<br>[3:0]: Reserved. |
| 0110 xxxx | STOP_GRANT<br>[0]: Reserved<br>[3:1]: SMAF. |
| 0111 xxxx | VID/FID Change<br>[3:0]: Reserved. |
| 1000 xxxx | WBINVD<br>[3:0]: Reserved. |
| 1001 xxxx | INVD<br>[3:0]: Reserved. |
| 1010 xxxx | [0]: SMIACK<br>[3:1]: Reserved. |
| 1011 xxxx | x86 platform-specific functions. |

In one embodiment, the I/O Hub generates upstream (directed to the host bridge) system management requests by directing a posted (requiring no response) write command to the system management address range shown in Table 2. Of course, other memory mappings may be used.

The system management command in the illustrated embodiment includes various fields described below. The SeqID[3:0] field is used to tag groups of requests that were issued as part of an ordered sequence by a device and must be strongly ordered within a virtual channel. All requests within the same I/O stream and virtual channel that have matching nonzero SeqID fields have their ordering maintained. A transaction that is not part of a sequence and has no sequence ordering restrictions may indicate that with a SeqID value of 0. The Cmd[5:0] field is the command field that defines the packet type, e.g. as a write or a broadcast. The UnitID[4:0] identifies participants in a transaction. Since all packets are transferred either to or from the host bridge, either the source or destination node is implied. The value 0 is reserved as the UnitID of the host bridge. The PassPW field indicates that that this packet is allowed to pass packets in the posted request channel of the same I/O stream. Otherwise, this packet stays ordered behind them. Addr[39:20] represents the address accessed by the request. The Count field, encodes the number of doubleword data elements that should be transferred, beginning at the specified address, and going in ascending order. Count codes of 0 through 15 represent 1 through 16 data elements to be transferred, respectively. The count field for the system management command is 0, which indicates that only a single doubleword data packet follows the write, and it contains byte masks, not data. The byte masks, used where finer address granularity is desired, are not used by the system management request and are all zeros.

TABLE 2

| Base Address | Top Address | Size | Use |
| --- | --- | --- | --- |
| 00_0000_0000h | FC_FFFF_FFFFh | 1012 Gbytes | DRAM/Memory-Mapped I/O |
| FD_0000_0000h | FD_F8FF_FFFFh | 3984 Mbytes | Interrupt/EOI |
| FD_F900_0000h | FD_F90F_FFFFh | 1 Mbyte | Legacy PIC IACK |
| FD_F910_0000h | FD_F91F_FFFFh | 1 Mbyte | System Management |
| FD_F920_0000h | FD_FBFF_FFFFh | 46 Mbytes | Reserved |
| FD_FC00_0000h | FD_FDFF_FFFFh | 32 Mbytes | I/O |
| FD_FE00_0000h | FD_FFFF_FFFFh | 32 Mbytes | Configuration |
| FE_0000_0000h | FF_FFFF_FFFFh | 8 Gbytes | Reserved |

While FIG. 7A shows one embodiment of a system management message format, other command and message formats may of course be utilized. Additional details on various aspects of an exemplary communication link and packets and commands associated therewith that may be used in the various embodiments described herein can be found in the HyperTransport™ I/O Link Specification, Revision 1.03, dated Oct. 10, 2001, which is incorporated herein by reference.

The host generates downstream system management requests by sending a broadcast packet down all the link I/O chains in the system. The address range in the broadcast packet identifies it as a system management request. The format of this packet is shown in FIG. 7B. For both upstream and downstream cases, the type of system management request (SysMgtCmd[7:0]) is encoded as shown in Table 1.

The information associated with the x86 legacy signals is transported using system management packets. The legacy signals that are inputs to processors include, IGNNE, A20M, STPCLK. These packets originate from the I/O hub and are sent upstream to the host as a posted write. They will then be reflected down all I/O chains as a broadcast packet. For each message, one bit represents the legacy signal. A 1 may be used to represent an assertion of the associated legacy pin, and a 0 to represent a deassertion of that pin.

Legacy signals such as FERR and SMIACK are output by the processor using system management messages. These packets originate from the host and are broadcast downstream to I/O devices in the system. For each message one bit of the message may be used to represent the legacy pin. A 1 represents an assertion of the associated legacy pin, and a 0 represents a deassertion of that pin. The legacy pin functionality represented by the SMIACK message is communicated by an assertion message when the processor enters system management mode (SMM) and is communicated by a deassertion message deasserted when the processor exits SMM.

In addition, as can be seen from Table 1, the system management packets carry special cycles such as HALT, which is generated by the processor in response to execution of a HALT instruction, and SHUTDOWN, which is generated by processor in response to a catastrophic error. These packets originate from the host and are broadcast downstream to all link I/O devices in the system. STOP_GRANT special cycles are generated by processor in response to a STPCLK assertion as described further herein. VID/FID change special cycles are generated by processor in response to a software controlled voltage (VID) or frequency (FID) change. A WBINVD special cycle is generated by processor in response to execution of a WBINVD instruction and an INVD special cycle is generated by processor in response to execution of an INVD instruction. These packets originate from the host and are broadcast downstream to all I/O link devices in the system.

Note that the state of the virtual wires in the I/O hub and the host bridge should match after reset. In one embodiment, the default state for all virtual wires, including all interrupts, IGNNE, A20M, FERR, STPCLK, and SMIACK, is deasserted.

The I/O hub (or south bridge according to the particular embodiment) includes BIOS-programmable configuration registers that specify the value for the SMAF sent from the I/O hub to the host bridge, based on the system state transition being executed. The I/O hub may provide separate BIOS programmable SMAF registers for each ACPI-defined state (as well as throttling) supported, and for host-initiated Voltage ID/Frequency ID (VID/FID) changes. These registers should be programmed by BIOS after boot, prior to any system state transitions from the fully operational state. Devices on the link monitor the SMAF value broadcast with the STOP_GRANT special cycle and take the appropriate power management actions based upon the SMAF value.

In addition to processors providing capability to stop or reduce their internal clocks, other integrated circuits used in PC systems such as those used for chipsets may also implement capability to gate portions of their internal clock grid during the C3 or S1 states after LDTSTOP# is asserted. Chipsets can determine which state is associated with stop grant by observing the SMAF associated with the stop grant broadcast. Tunnel chips may provide programmable options for clock gating. The I/O Hub provides programmability related to LDTSTOP# assertion.

Table 3 defines exemplary SMAF codes that may be utilized in a personal computer system:

TABLE 3

| Reason for STPCLK message | Bits [3:1] of STPCLK Message | Mechanism Which Forces the I/O Hub to send the STPCLK message | Processor's Programmed response to this version of the STPCLK system management message after entering the Stop Grant state. |
| --- | --- | --- | --- |
| C2 Stop Grant Caches Snoopable. | 000 | Sent in response to a read of the ACPI 1.0b defined P_LVL2 register. | Ramp the CPU grid down when no probes need to be serviced. |
| C3 Stop Grant Caches not Snoopable. Used by mobile systems. | 001 | Sent in response to a read of the ACPI 1.0b defined P_LVL3 register. | Ramp the CPU clock grid frequency down. After LDTSTOP# is asserted, place memory into self refresh and ramp down the processor's northbridge clock |
| VID/FID Change Or Link Width/ Frequency changes | 010 | Sent in response to a VID/FID Change special cycle from the processor or in response to a write to an I/O Hub register to initiate Link Width | After LDTSTOP# assertion, place memory into self refresh, ramp the processor's clock grids down, then drive new VID [4:0] to the DC/DC converter and FID values |

TABLE 3-continued

| | | | |
|---|---|---|---|
| | | or Frequency changes. | to PLL. |
| S1 sleep state | 011 | Sent in response to writing the S1 value to the SLP_TYP [2:0] field and setting the SLP_EN bit of the ACPI defined PM1 control register in the I/O hub. | Same response as C3. |
| S3 sleep state | 100 | Sent in response to writing the S3 value to the SLP_TYP [2:0] field of the PM1 control register. | Same response as C3. Additionally, after LDTSTOP# has been asserted, the I/O Hub will power off the main power planes. |
| Throttling | 101 | This will occur based on Hardware thermal throttling or ACPI controlled throttling. | Ramp down the CPU grid by the programmed amount. |
| S4/S5 | 110 | Sent in response to writing the S4 or S5 value to the SLP_TYP[2:0] field of the PM1 control register. | Same response as S3 for processor. All power will be removed from processor during S4 and S5. |
| Reserved | 111 | No I/O Hub STPCLK message uses this SMAF code. The processor power management register field corresponding to this SMAF code is used by the processor in response to executing the Halt instruction. | Same response as C2, except a Halt Special cycle is broadcast. |

Note that the particular SMAF that is utilized to cause link/width changes may vary. For example, while Table 3 indicates that a SMAF utilized for VID/FID change may also be used for link width/frequency changes, other SMAF codes such as C3 Stop Grant may be utilized.

Additional details are now provided for an exemplary embodiment of the use of the power management messages in combination with the LDTSTOP# and REQ# signals where applicable. When certain power management control registers are accessed in the I/O Hub integrated circuit, e.g., in one embodiment, when the ACPI P 1_CNT register is written, or the P_LVL2 or P_LVL3 registers are read, the I/O Hub sends the STPCLK system management message to the processor before sending the response (an acknowledge or data in the case of a read operation) to the read or write which caused the STPCLK assertion. This is to ensure that the Stop Grant state is entered on the boundary of the read or write I/O instruction that was executed to place the processor into the Stop Grant state. When the host bridge receives a system management message with STPCLK asserted, it preserves the ordering of that system management message relative to all subsequent messages. That ensures that Stop Grant is entered on the instruction boundary that it was intended to occur on.

Figure 8:
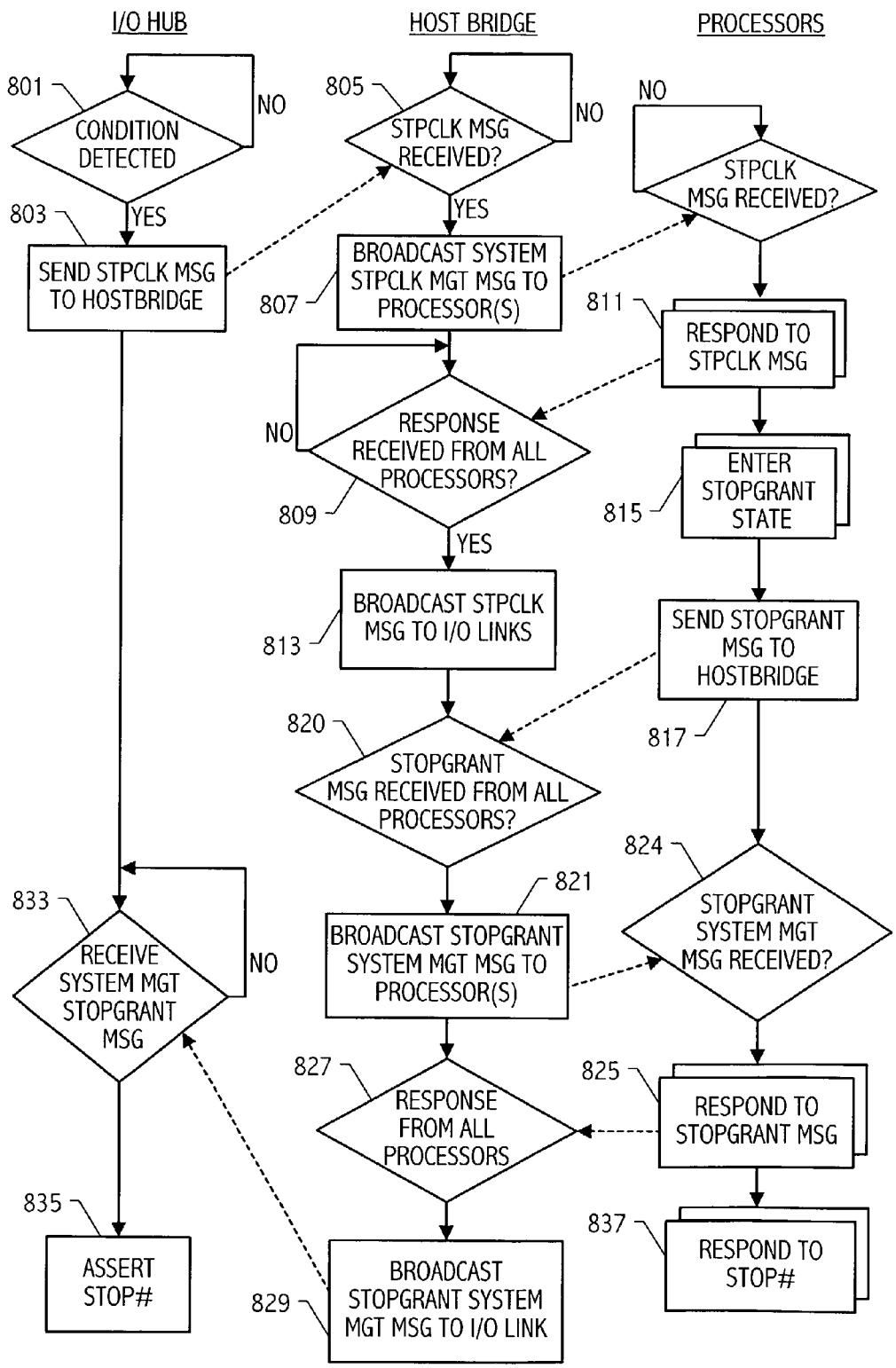
FIG. 8 illustrates a flow diagram of operation of the stop clock/stop grant protocol according to an embodiment of the invention used to cause system power state changes.

The STPCLK/Stop Grant protocol is used to cause system state changes for purposes such as those listed in Table 3. The following is a functional description of the processor/communication link STPCLK/Stop Grant protocol. With reference to FIG. 8, the processor/communication link STPCLK/Stop Grant protocol is initiated by the I/O hub in response to the detection of such conditions at 801 as hardware events (thermal), register reads/writes, or special cycle detection. In response to detection of one of the conditions, the I/O hub sends a STPCLK system management message to the host bridge with the STPCLK bit asserted in 803. The reason for the STPCLK communication link system management message is indicated by the SMAF code in the STPCLK message as defined in Table 3.

When the host bridge receives the STPCLK system management message at 805, it broadcasts the STPCLK system management message (with the STPCLK bit asserted and preserving bits [3:1] of the SysMgtCmd field) to the processor(s) at 807 and waits for a response from the processor(s) at 809. That presumes a multi-processor system. In a uni-processor system, the host bridge communicates internally with appropriate processor logic. The processors acknowledge receipt of the STPCLK message at 811. After receiving an acknowledge from all the processors, the host bridge broadcasts the STPCLK message to all devices on the non-coherent communication links at 813 using a broadcast packet such as shown in FIG. 7B. The host bridge should receive a response from the processor(s) that the STPCLK message was received before passing any subsequent messages to the processor(s). After a processor issues a response message (an acknowledge) to the STPCLK broadcast, it enters the Stop Grant state at 815 in which application and operating system code execution is stopped and issues a Stop Grant message to the host bridge at 817. When the host bridge receives the Stop Grant message from the processor (all processors for MP systems), it broadcasts a Stop Grant system management message to the processor(s) at 821. This Stop Grant message contains the SMAF of the last STPCLK message received prior to receiving the response to the Stop Grant message from the processor(s). The processor(s) acknowledge the stop grant system management message at 825. After the host bridge receives a response message to the Stop Grant broadcast from the processor (all processors in MP systems) at 827, the host bridge passes the Stop Grant broadcast to the non-coherent communication link(s) at 829.

Once the I/O Hub has sent a STPCLK message, it does not de-assert STPCLK until it receives a Stop Grant system management message. Note that once the I/O Hub has sent a STPCLK message, it does not generally send a subsequent STPCLK assertion message until it has first de-asserted STPCLK. However, the I/O hub may send a subsequent STPCLK assertion message in response to an I/O read or I/O write to ACPI 1.0b defined registers for processor and system state control. That covers the case where a STPCLK message is sent to force thermal throttling at the same time that an I/O write or read is sent to force an ACPI processor or system state transition. The SMAF from the last STPCLK message received, before the processor returns a Stop Grant message to the host bridge, is used by the host bridge when it broadcasts the Stop Grant message back to the processor(s) before broadcasting the Stop Grant message to the I/O portion of the communication link at 821.

The processor is responsible for maintaining the order in which STPCLK and SMI system management messages are received. If the host bridge receives the STPCLK message first, it ensures the processor will enter the Stop Grant state before the SMI message is sent to the processor. Throttling differs from most system state transitions in that the I/O hub sends STPCLK assertion messages to the host without direct initiating messages. If a STPCLK assertion message for throttling is sent from the I/O hub and then a system state transition is initiated via a posted access from the host to the I/O hub (such as the VID/FID system management cycle), then the I/O hub waits for the Stop Grant system management message from the host, sends a STPCLK deassertion message, and sends the STPCLK assertion message to the host with the SMAF field programmed for the host-initiated system state transition. After STPCLK has been asserted by the I/O Hub for an ACPI defined state (C2, C3, S1) or VID/FID_Change, STPCLK is not asserted for throttling until it has been de-asserted for the ACPI state or the VID/FID_Change.

There is no deadlock possibility when roughly coincident throttling STPCLK assertion messages occur with interrupt requests. They are naturally resolved as follows. If a STPCLK assertion message for throttling is sent from the I/O hub simultaneously with a host-initiated nonposted command that results in an interrupt request (e.g., SMI), then the I/O hub sends the interrupt request to the host followed by the response to the nonposted command. The host bridge sends the Stop Grant system management message after it receives the response. If an asynchronous interrupt request (not initiated by a host nonposted request) is received by the host after the STPCLK assertion message, then the interrupt request is accepted by the host, regardless of whether the Stop Grant system management message has been sent. However, the host bridge might not act on the interrupt request until the STPCLK deassertion message is received by the host bridge.

When the processor recognizes the Stop Grant system management message ¡broadcast at 824, the core clock grid may be divided down (if programmed to do so and no probe activity is present). When the I/O Hub receives the Stop Grant special cycle system management message at 833, it knows that the processor(s) are in the Stop Grant state, and the I/O Hub can assert LDTSTOP# signal at 835 if that is necessary for the version of STPCLK/Stop Grant that was requested. If LDTSTOP# is asserted by the I/O Hub, then it must be de-asserted before the Stop Grant state can be exited. The I/O Hub may pass the Stop Grant special cycle to the PCI bus for debug purposes. The processors respond to the assertion of LDTSTOP# at 837 according to the value of SMAF and how they have been programmed or hardwired to respond to that value.

CPU voltage and frequency transitions, placing memory into self refresh mode (if processor's memory controller is used), and power managing the portion of the processor integrated circuit that includes the memory controller and the host bridge occur if: (1) they are programmed to (in the processor, and by the System Management Action Field of STPCLK), and (2) LDTSTOP# is asserted and the processor's communication links are disconnected or tri-stated. The processor may have a timer which can be programmed using an MSR to insert a delay from the time LDTSTOP# is asserted (causing its communication links to be disconnected in response) to the time that the processor drives new voltage control (VID) values to the voltage controller, e.g. a DC—DC converter, for VID/FID_Changes. The timer supports MP systems in which a single DC/DC converter supplies the voltage for multiple processors. The timer allows one processor to control the core voltage of multiple processors since different processors may take longer to achieve a suitable state, e.g., clocks ramped down appropriately, in which voltage can be changed. In uni-processor systems or in multi-processor systems in which each processor controls its own voltage, this count can be set to zero by BIOS.

To exit the Stop Grant state, the I/O Hub de-asserts LDTSTOP# and waits for its links to re-initialize (if LDTSTOP# was asserted). The I/O Hub sends a STPCLK system management message to the host bridge with the STPCLK bit de-asserted to indicate the end of the STPCLK state. If the processor's core voltage was reduced while in the Stop Grant state, the processor drives an operational VID when LDTSTOP# is de-asserted. If the processor's host bridge clock grid was ramped down during the stop grant state based on SMAF and LDTSTOP# assertion, then it is ramped back up when LDTSTOP# de-assertion is detected. When LDTSTOP# is de-asserted, the processor re-initializes its links. When the host bridge receives the STPCLK system management message with the STPCLK bit de-asserted it broadcasts the STPCLK system management message to the processor(s) and waits for a response from the processor(s) and then broadcasts the STPCLK message to all I/O links. When the processor receives the STPCLK de-assertion message, it ramps its CPU clock grid to full frequency if it was divided down, exits the stop grant state, and sends a response to the STPCLK de-assertion message to the host bridge.

Another power management capability provided by the system described herein is to support processor performance state transitions for processor power management. Transitions between Processor Performance states comprised of combinations of the processor core frequency and core voltage are accomplished under software control. The transitions use a command sent over the communication link (VID/FID_Change system management message) to initiate the change in processor performance states, using the STPCLK/Stop Grant messages and protocol described in FIG. 8, and the LDTSTOP# signal.

In one embodiment, the processor includes FidVidCtl model specific register (MSR), which has fields to dictate the following for a VID/FID Change. The VID[4:0] field specifies the new voltage. The FID[5:0] (clock multiplier) field specifies the multiplier that will be applied to the phase-locked loop (PLL) for the CPU core clock. A FID/VID Change Initiation bit in the MSR, when written to a one, initiates a processor performance state change by causing the VID/FID Change special cycle to be issued by the processor to the I/O Hub. The response to the VID/FID Change special cycle is shown in Table 3. The Stop Grant Timeout Count field in the MSR specifies how long the processor remains in the Stop Grant state to allow the FID/VID transition to complete. This bit field specifies the number of clocks, e.g., 200 MHz clocks, required to complete the processor's frequency transition. A separate model specific register (MSR) may be used to specify the time allowed for the voltage transition. The I/o Hub will assert LDTSTOP# for a period of time, e.g., 16 µs, and then deassert LDTSTOP#. When LDTSTOP# is deasserted, devices on the link reconnect when they are capable of reconnecting. The CPU does not reconnect until the power state transition is complete.

In one embodiment, a read only FidVidStatus MSR in the processor has fields that provide the currentFID[5:0], and a startup FID[5:0] (the frequency that the processor starts up at when PWROK is asserted). Note that the processor may or may not apply the Startup FID to its PLL in response to RESET# assertion depending on its implementation. A MaxFID[5:0] field prevents transitions to clock multipliers greater than dictated by this field. If a FID change to a higher FID is attempted, the processor will transition to MaxFID, and reflect this in the Current FID field. The FidVidChgPending bit is set when the FID/VID Change Initiation bit is written to a one in the FidVidCtrl MSR, and cleared when the Stop Grant timeout count expires and the VID/FID change is complete. The current VID[4:0] field provides the current VID and a startup VID[4:0] field is the VID code driven by the processor when PWROK is asserted. The MaxVID[4:0] field specifies the maximum voltage and prevents transitions to voltages higher than specified by this field. If a VID change to a voltage higher than MaxVID is attempted, the processor transitions to the MaxVID voltage, and reports this voltage in the Current VID field.

The I/O Hub detects the VID/FID_Change special cycle and can be configured by BIOS or "hard wired" to respond with a STPCLK assertion message with a SMAF indicating a VID/FID_Change. In the processor configuration space there are two configuration registers dictating the processor's response to the various SMAF codes. The registers allow software to force the processor to have the responses to SMAF defined in Table 3.

The I/O Hub contains a configuration register with a field that can be programmed to determine how long LDTSTOP# shall remain asserted for VID/FID_Changes. Values may support ranges from e.g., 1 microsecond to 100 microseconds. For example, in certain mobile systems LDTSTOP# shall remain asserted for 10 us to 20 us. The specific value is dependent on system implementation and may be configured by BIOS during POST.

The protocol sequence for the VID/FID_Change is as follows. When software determines that a VID/FID (processor performance state) transition is needed, software executes a write MSR (WRMSR) instruction to the FidVidCtl MSR in the processor. The VID and FID Fields are written to specify the target performance state, the Stop Grant Timeout Count (SGTC) field is programmed to select an appropriate transition time and the FidVidChgInitiate bit is set, which initiates a VID/FID change special cycle.

The Stop Grant time out counter is programmed with a value that allows for the processor PLL to lock at the new frequency. A separate MSR can be programmed during a power on sequence to dictate the amount of time the processor will allow for the core voltage to transition from a lower to higher voltage before increasing the processor's frequency.

Note that voltage and frequency changes may be done in two steps to reduce the amount of time memory is unavailable, e.g., for snoops. Thus, to increase clock frequency, a VID change is performed to increase the voltage, and then a separate FID special cycle is generated to start the STPCLK/Stop Grant sequence used to effect a frequency change. In that way the maximum length of time that memory is unavailable is reduced to the longer of the VID or the FID change, but not the combined length.

In a multiprocessor (MP) system if multiple processors were going to have a performance state change at the same time, the processor driver only asserts the FidVidChgInitiate bit in one of the processors after the others have been setup for the transition. Software is not required to transition the performance state of all processors at the same time. Software then spins (while not in a stop grant state) on a read of the FidVidStatus MSR waiting for the FidVidChgPending bit to be cleared. For multiprocessor systems, the FidVidChgPending bit may be monitored on the processor which was used to initiate the VID/FID_Change.

In response to the FidVidChgInitiate bit being written to a one, the CPU issues a VID/FID_Change special cycle system management message over the communication link. The host bridge broadcasts the special cycle to the processor and waits for a response before broadcasting it to the I/O link(s). The I/O Hub is the only device in the system which responds to the VID/FID_Change special cycle link message. In response to the VID/FID_Change special cycle, the I/O Hub responds with a STPCLK message with the SMAF set to indicate a VID/FID_change. The STPCLK/Stop Grant protocol described previously is followed.

When the I/O Hub recognizes the Stop Grant special cycle it responds by asserting LDTSTOP# for the appropriate time. When the LDTSTOP# assertion is recognized by the link devices in the system, they disconnect then tri-state their links.

When the links to the processor have been disconnected (for mobile systems, the processor may only use one link), the processor host bridge and memory controller and CPU clock grids are ramped down (if system memory is controlled by the processor, it is placed into self refresh before the clock grids are ramped down).

Then, if the performance state transition is from a lower performance state to a higher performance state, the VID[4:0] dictated by the FidVidCtl MSR is driven to the processor core voltage DC/DC converter and the voltage transitions to the specified value. A processor MSR, which may be programmed by BIOS during a power on sequence, determines how long the voltage transition will take. Also, the FID[5:0] value dictated by the FidVidCtl MSR is applied to the processor's PLL and the PLL's frequency transitions. The Stop Grant Timeout Counter, which dictates the time allowed for the frequency transition to occur, will begin to count down. Note that in some implementations, the Stop Grant Timeout Counter may be used to time the voltage transition as well as the frequency transition.

If the performance state transition is from a higher performance state to a lower performance state then the FID[5:0] value specified by the FidVidCtl MSR is applied to the processor's PLL and the PLL's frequency transitions. At the same time, the VID[4:0] dictated by the FidVidCtl MSR is driven to the processor core voltage DC/DC converter and the voltage transitions to the specified value first. The Stop Grant Timeout Count, which specifies the time allowed for the frequency transition to occur (PLL lock to the new frequency), begins to count down. Note that it is not necessary for the voltage to transition to the lower level before the processor begins re-connecting its link. After LDTSTOP# has been asserted for an appropriate amount of time as determined by the configuration register, the I/O Hub de-asserts it, and sends a STPCLK message with the STPCLK bit de-asserted to the processor once the links re-initialize.

When the processor completes its performance state transition, LDTSTOP# will have previously been de-asserted, and the processor will ramp its north bridge clock grid back up to full frequency. After the processor north bridge clock grid is back at full operational frequency, the processor re-connects its communication link. After the link is re-connected, a STPCLK message with the STPCLK bit de-asserted is received by the host bridge from the I/O Hub. The host bridge will follow the STPCLK protocol described previously. The processor's CPU clock grid will be ramped up to full frequency, and then the CPU will be brought out of the Stop Grant state. At that point, normal CPU OS/driver/ application code execution resumes. The completion of the VID/FID change causes the FidVidChgInitiate bit to be cleared. Software reads the FidVidChgInitiate bit in the FidVidStatus MSR and determines that the VID/FID change has occurred.

Note that in prior art systems, the various ACPI state transitions required use of sideband signals, which increased complexity of the motherboard design and cost pins on both the chipset and the processor. With message based power management the sideband signals can be eliminated, resulting in fewer pins on the processor and chipset packages devoted to power management. Additionally, the motherboard is easier to implement. Further, because the various power management fields are programmable, there can be more granularity in system power management response in the processor and chipset based on the reason for the power management activity, e.g., the assertion of STPCLK.

Referring again to Table 3, various ACPI state transitions described therein are now described in greater detail. For the processor, the C2 processor power state is entered when the operating system (OS) or ACPI/CPU driver reads the ACPI defined P_LVL2 (Processor Level 2) register located in the I/O Hub. A Power Management register in the processor can be programmed to control the processor's power management response to the Stop Grant special cycle. The power management that occurs in the processor during the C2 state is to divide the CPU clock grid by a predetermined amount, e.g., 512 when no probe activity is present. The processor may ramp up its clock grid to service probe activity during the C2 state. The LDTSTOP# signal is not asserted during the C2 state. In response to a read of the P_LVL2 register, the I/O Hub sends a STPCLK system management message to the processor host bridge (host bridge) with the SMAF field indicating C2. The process of placing the processor into the stop grant state is as described above. Exiting the C2 state occurs when the processor receives a STPCLK system management message from the I/O Hub with the STPCLK bit de-asserted. The I/O hub de-asserts STPCLK in response to, e.g., an interrupt.

The C3 processor power state is typically used by notebook personal computers (PCs) and not used by desktops or servers. For the processor, entry into the C3 processor power state is triggered by the OS or ACPI/CPU driver reading the ACPI defined P_LVL3 (Processor Level 3) register located in the I/O Hub. Before reading the P_LVL3 register, the OS determine the processor is idle, checks the BM_STS bit in the ACPI defined PM1_STS register (located in the I/O Hub) to determine that there is no bus master activity and sets the ARB_DIS bit in the ACPI defined PM2_CNT register to prevent PCI Bus Masters from being granted the Bus.

In an embodiment with an integrated Graphics/Northbridge/Memory controller, the controller uses the LDTSTOP# protocol to prevent probes of the processor during C3. Bus masters in the integrated graphics/northbridge/memory controller assert the REQ# signal to cause the I/O Hub to bring the processor out of the C3 state. The OS also may read the ACPI defined PM_TMR (located in the I/O Hub) to keep track of how long the processor remains in the C3 state.

In response to the read of the P_LVL3 register, I/O Hub sends a STPCLK message to the processor north bridge with the SMAF code indicating C3. The processor enters the Stop Grant state in response to the STPCLK system management message as described above. The I/O Hub is configured by BIOS (or hardwired) to assert LDTSTOP# during the C3 processor state, and to use the appropriate C3 SMAF code in response to a read of the P_LVL3 register. The processor can be configured by BIOS to respond to assertion of LDTSTOP# by dividing the CPU clock grid by, e.g., 256 or 512 or other appropriate amount. Dividing the clock grid can occur when the processor host bridge broadcasts the Stop Grant Special cycle if no probe traffic is present, but does not need to wait for LDTSTOP# assertion. The memory controller portion of the processor integrated circuit places system memory into self refresh after LDTSTOP# assertion, and the processor north bridge clock is ramped down after LDTSTOP# is asserted and its communication links are disabled and tri-stated. The processor may also drive a lower VID to save additional power during the C3 state.

The processor enters the Stop Grant state and issues a Stop Grant special cycle with the C3 SMAF code. The I/O Hub receives the Stop Grant and asserts LDTSTOP#. Link devices, disconnect and tristate their link connections in response to assertion of the LDTSTOP# signal. With the communication links disconnected, the processor and/or other link devices are isolated from other devices in the system and take the appropriate power management action associated with the C3 state, such as gating clocks.

The C3 stop grant state exit sequence begins when the I/O Hub deasserts the LDTSTOP# signal in response to a resume event such as an interrupt or a bus master request or a REQ# assertion. Deassertion of the LDTSTOP# signal is followed by link initialization since the link was disconnected and tristated. Prior to the processor completing initialization of its links, it ramps its north bridge clock grid back up to operating frequency. After the links are initialized, the I/O Hub sends a STPCLK message to the processor with the STPCLK bit de-asserted. The processor north bridge broadcasts the message with STPCLK de-asserted to all links. The CPU exits the Stop Grant state. The OS may read the PM timer to determine the amount of time spent in the C3 state. The OS writes to the PM1 control register to de-assert the ARB_DIS bit and normal operation proceeds.

The implementation of the processor S1 state is similar to the C3 state. Note that the C3 state is a processor power state which occurs during the system working state S0 and is transparent to the user. The S1 Sleep state, however looks like the machine is off except for an LED to indicate to the user that the system is in a suspend (sleep) state. The I/O Hub is programmed to send an S1 SMAF code with the STPCLK message in response to the OS selecting the S1 sleep state by writing the appropriate value to the SLP_TYP [2:0] field of the ACPI defined PM1_CNT (Power Management 1 Control) register and setting the SLP_EN bit in the same register. The S1 Sleep state is entered based on a pre-determined period of system inactivity (20 minutes for example), a sleep button press, or the Start→Shut Down→Stand by sequence. Before placing the system into the S1 sleep state, the OS calls device drivers to place all of the devices in the system into the D3 state. When in D3, devices are not enabled to generate bus master activity or working state interrupts. Note that for a MP system only the boot strap processor (BSP) is active when the system is placed into the S1 sleep state (all other processors are spinning in a wait loop). The S1 state is exited in response to enabled wake events. Working state interrupts are disabled during S1. When the I/O Hub detects an enabled wake event, it begins the resume process by de-asserting LDTSTOP#. As with the C3 processor power state, the S1 system sleep state uses the STPCLK/Stop Grant protocol described previously.

The sequence into the S3 (Suspend to RAM) sleep state uses the processor/link/Stop Grant Protocol described above. The OS determines that the system should be placed into the S3 sleep state. As an example, this could be the result of a suspend button press, or an idle period of predetermined length (for example 20 minutes). The OS calls the drivers for all of the devices in the system, and places all devices into a low power state (D3) which prepares the device for power removal, and prevents the devices from generating bus master activity. In some systems, some devices may be enabled to wake the system (Wake on Ring/Wake on LAN for example). The OS writes the SLP_TYP[2:0] field of the Power Management 1 Control register to the value specified for S3 by the BIOS and sets the SLP_EN bit. SLP_TYP[2:0] and SLP_EN are both part of the ACPI 1.0b defined Power Management 1 Control register in the I/O Hub. The I/O Hub sends an STPCLK system management message to the processor with bit 0 (STPCLK) asserted and the SMAF (System Management Action Field) bits [3:1] of set to indicate the S3 sleep state. When the I/O Hub receives the Stop Grant Special cycle broadcast with the SMAF set to indicate the S3 sleep sate, it asserts the LDTSTOP# signal. Note that the I/O hub does not check the SMAF in Stop Grant messages. The SMAF for the Stop Grant Special cycle is also bits 3:1 of the SysMgtCmd field.

In response to LDTSTOP# assertion, the processor disconnects and tri-states its links, places system memory into self refresh, and ramps down its north bridge clock grid. The processor CPU clock grid is already ramped down assuming no probe traffic is present (this is an orderly OS directed sleep state entry). The processor prepares itself for power removal from the main power planes. The resumption from S3 is similar to the power on sequence except that the system context is preserved in system memory.

The sequences to enter the S4 (Suspend to Disk, Hibernate) sleep state and the S5 (Soft Off) state uses the processor/STPCLK/Stop Grant Protocol described above. Resuming from the S4 state follows the normal power on sequence, except that system context is restored from the Disk, and the OS is not re-booted. Returning to the S0 (working) state from S5 requires a complete boot of the OS.

Multiple forms of throttling may be supported using the processor/STPCLK/Stop Grant protocol described above, which use a SMAF code indicating throttling. During throttling, the processor CPU clock grid may be ramped down such that it has a minimum resume latency. Note that the processor is not configured to ramp down its north bridge clock grid (assuming an integrated memory control function in the processor), or place system memory into self refresh during throttling.

The I/O Hub may incorporate the 1 microsecond Stop Grant exit latency into the portion of the throttling period in which the processor is held in the Stop Grant state. As an example, if the throttling period is 30 microseconds, and a duty cycle of ⅞ths is chosen, the processor is held in stop grant for 30 us(⅞)−1 us=25.25 us. This latency may be so small that it doesn't need to be compensated for. After the I/O Hub sends a STPCLK message for throttling, it receives a corresponding Stop Grant special cycle before sending the message to de-assert STPCLK.

Hardware thermal throttling results from the assertion of the THERM# input to the I/O Hub due to a thermal condition. Throttling initiated by assertion of the THERM# input of the I/O Hub uses the standard 244 us throttling period and is programmed by BIOS to throttle the CPU at 50 percent if the THERM# input is asserted for 2 seconds. An SCI (System Control Interrupt) will be generated in response to initial assertion of the THERM# input, and it is expected that software will normally be able to correct the processor thermal condition which caused THERM# assertion before thermal throttling is actually initiated. Optionally, the I/O Hub may be programmed to assert LDTSTOP# during THERM# initiated throttling.

Throttling may also be initiated by the OS, and is also used for thermal management of the processor. Throttling initiated by the OS, uses the ACPI 1.0b defined P_CNT (Processor Control) Register. A throttling period of 30 us keeps throttling out of the audible range. The LDTSTOP# signal assertion is programmable for OS initiated throttling as well, but LDTSTOP# may not be asserted during OS initiated throttling in mobile systems.

While the power management messages have generally been described above as relating to changes in voltage or frequency to achieve power savings, the power management messages may also, or instead, cause parts of the computer system or the receiving processor(s) being shut down. For example, one or more of the execution units in one or more processors may be turned off to save power. In a multi-processor system, one or more of the processors may be turned off. The dispatch rate of one or more of the execution units may be limited. The display may be turned off. Of course, a power management deassertion message may cause all these restrictions to be reversed and normal operation to resume. These are just examples of the types of power management messages that can be conveyed. Because the power management message can be conveyed without resorting to discrete signal lines, the computer system can be more responsive to operating conditions to provide effective power management capability.

An important advantage of utilizing LDTSTOP# to adjust the link width/frequency is that during the POST routine while the various links are being initialized, the system does not have to utilize a cold or warm reset to in order to specify the link widths and frequencies. In addition, if link widths were to be changed during system operation for fault tolerant or power management reasons, a warm reset would result in the machine state changing making it undesirable to try and utilize link width/frequency changes in such an environment. However, the use of a separate control signal, such as LDTSTOP# to cause link width/frequency changes to take effect allows dynamically changing width and/or frequency during system operation without affecting the machine state in the manner a reset would affect the machine state. For example, links may be switched to a lower performance state when the system is operating on battery power.

Note that while the LDTSTOP# signal has been described herein as a control signal suitable for signaling change in link width and or frequency, a different control signal or a sideband signal dedicated to such a function may also be utilized.

Thus, resizing link width and frequency has been described that utilizes in one embodiment a message based power management system. The various commands and sequences described herein are intended to be illustrative and are not intended to limit the scope of the invention as set forth in the following claims. Other variations and modifications of the embodiments disclosed herein, may be made based on the description set forth herein, without departing from the scope and spirit of the invention as set forth in the following claims.

What is claimed is:

1. A method comprising:
    changing a width of at least a portion of a communication link coupled to a device to a different width in response to a change in a logical level of a signal line coupled to the device, without the device entering a reset state, the signal line being separate from the communication link and utilized to control power management activities in the device; and specifying separately a transmit width and receive width.

2. The method as recited in claim 1 wherein the width is changed during a power-on self test (POST) routine.

3. The method as recited in claim 1 wherein the width is changed according to usage of the communication link.

4. The method as recited in claim 1 wherein the width is changed according to a power state associated with the device.

5. The method as recited in claim 1 further comprising writing a storage location to program the different width.

6. The method as recited in claim 1 further comprising changing the width as part of a power management activity.

7. The method as recited in claim 6 further comprising reducing the width in response to power being supplied from a battery.

8. A method comprising:

changing a width of at least a portion of a communication link coupled to a device to a desired width in response to a change in a logical level of a signal line coupled to the device, without the device entering a reset state, the signal line being separate from the communication link and utilized to control power management activities in the device;

changing a frequency of operation of at least a portion of the communication link to a different frequency in response to the change in the logical value of the signal line without the device entering the reset state; and specifying a transmit frequency and a receive frequency.

9. The method as recited in claim 8 wherein the different frequency is determined according to usage of the communication link.

10. The method as recited in claim 8 wherein the frequency is changed according to usage of the communication link.

11. The method as recited in claim 8 further comprising writing a storage location to program the different frequency.

12. A computer system comprising:

an integrated circuit coupled to a communication link;

a control signal coupled to the integrated circuit;

first and second programmable fields specifying respectively a transmit width and a receive width of a data portion of the communication link; and wherein the integrated circuit is responsive to a change in a value of the control signal to adjust the transmit and receive widths according to respective values of the first and second programmable fields, the integrated circuit coupled to adjust the transmit and receive widths according to the respective values of the first and second programmable fields while maintaining its operational state.

13. The computer system as recited in claim 12 wherein the integrated circuit further comprises:

a third programmable field specifying a frequency of operation of the communication link; and wherein the integrated circuit is responsive to the change in the value of the control signal to adjust the frequency of the communication link according to a value of the third programmable field, the integrated circuit being coupled to adjust the frequency of the data portion while maintaining its operational state.

14. A computer system comprising:

a communication link;

an integrated circuit coupled to the communication link;

a signal line separate from the communication link coupled to the integrated circuit;

means for changing at least one of a width or frequency of the communication link in response to a change of the signal line without the integrated circuit entering a reset state; and wherein the signal line is a power management control signal utilized to indicate a stop grant state.

15. A method for changing a width of at least a portion of a communication link coupled to an integrated circuit comprising:

writing an updated link width to a link width field in a control register, the updated link width being different from a current link width;

in response to a first change in a logical level of a control signal being supplied to the integrated circuit, disconnecting from the link including placing communication link drivers in a high impedance state; and in response to a second change in the logical level of the control signal, restarting the communication link utilizing the updated link width.

16. The method as recited in claim 15 wherein the first change is an assertion of the control signal and the second change is a desassertion of the control signal.

* * * * *